J. BAKA-ABAKOWSKY.
FISHED JOINT FOR RAILS.
APPLICATION FILED JUNE 3, 1908
908,934.
Patented Jan. 5, 1909.
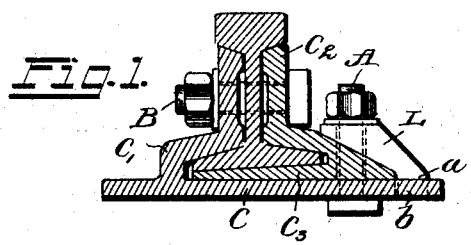
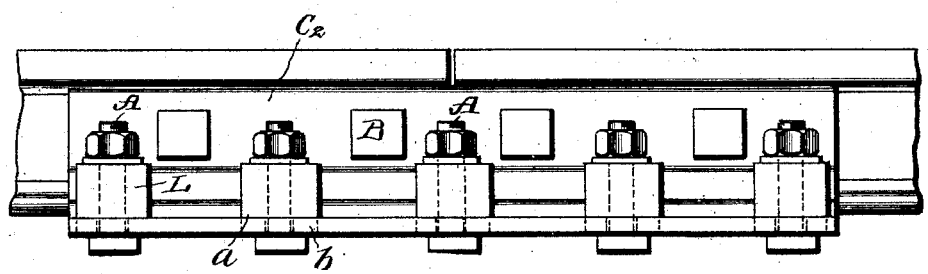
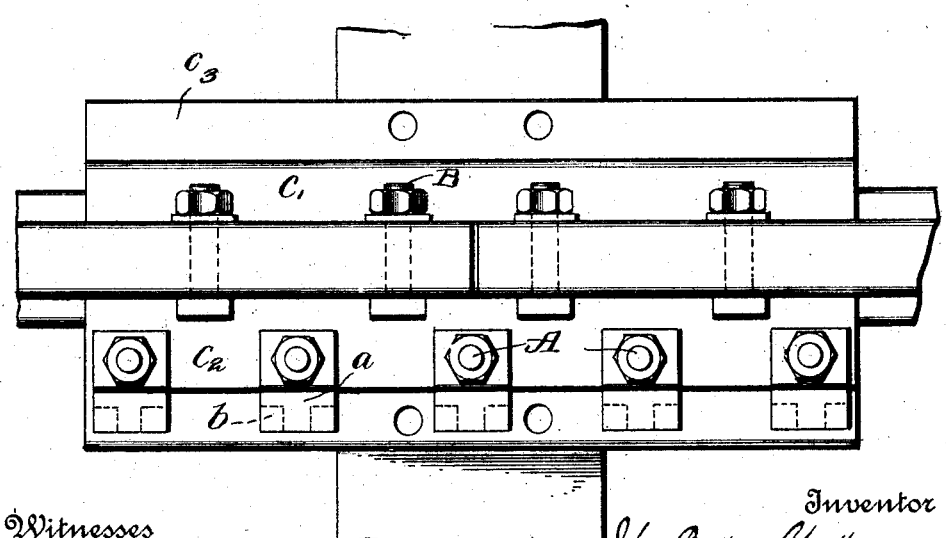

UNITED STATES PATENT OFFICE.

JOHN BAKA-ABAKOWSKY, OF KURSK, RUSSIA.

FISHED JOINT FOR RAILS.

No. 908,934.  Specification of Letters Patent.  Patented Jan. 5, 1909.

Application filed June 3, 1908. Serial No. 436,456.

*To all whom it may concern:*

Be it known that I, JOHN BAKA-ABAKOWSKY, a subject of the Emperor of Russia, residing at Kursk, Russia, railway office, have invented new and useful Improvements in Fished Joints for Rails, of which the following is a specification.

This invention relates to a fished joint for rails which insures a rigid, unvarying connection owing to the close contact between the surfaces which come together, and whereby the cross section lost at the abutting faces of the rails is reduced to a minimum. Further the fish-joint is adapted to support all bending, torsional and compression strains in such a manner that relative motion between the two abutting faces of the rails is substantially impossible. The fish plates used bring the rails as close as possible together so that the train runs more smoothly than has hitherto been the case on fished rails.

In the accompanying drawings one construction according to the invention is shown, Figure 1 being a cross section, Fig. 2 a side elevation and Fig. 3 a plan.

One fish plate $C^2$ rolled in one piece with a base plate $C^3$ embraces the flange on one side of the rail, while the other fish-plate $C'$, also rolled in one piece with its base plate embraces the flange on the other side of the rail and also the base plate $C^3$. The fish-plate $C^2$ is on the outside of the track, while $C'$ is on the inside. The fish plates are held to the rails in the usual manner by bolts B which extend through corresponding holes in the rails. In addition the outside fish plate $C^2$ and the base plate C of the inside fish-plate are bolted together by bolts A A with interposition of pieces L of special construction hereinafter described.

When bolts A are tightened the pieces L act to bring the two fish plates as close together as possible until they grip the flange of the rail with which they are in contact over the whole surface. In this manner any inexactness of profile caused during rolling is completely neutralized thus showing a great advantage over other forms of rail-joints. The bolts B are then screwed up, so that owing to the flexibility of the fish plates the rail heads also become intimately united with the fish plates and so form a resistant whole.

The shape of the plate L is of great importance since it has to produce a horizontal force. One way of effecting this is shown in the drawing where the plate L has a foot $a$ having two projections $b$ $b$ which fit in corresponding holes in the base plate C of the butt-strap $C'$.

Owing to the rigid connection obtained the wheel pressure is transmitted directly to the base plates of the fish plates and the breadth of the base plates distributes the pressure so that the material cannot be crushed or the joint become loose.

I claim as my invention:

1. A fish joint for rails, comprising a fish plate having a base plate formed integral therewith adapted to pass beneath the rail, a second fish plate having a base plate formed integral therewith and adapted to engage beneath the first named base plate; a bolt extending through both base plates for securing them together, and means actuated by the vertical compress of the bolt for simultaneously tending to move said fish plates together.

2. A fish joint for rails comprising a fish plate having a wedge-shaped base plate formed integral therewith adapted to pass beneath the rail, a second fish plate having a base plate formed integral therewith and adapted to engage beneath the first named base plate, a bolt through both base plates for securing them together, and means actuated by the vertical compress of the bolt for simultaneously tending to move said fish plates together horizontally.

In testimony whereof I have signed my name to this specification in the presence of two subscribing witnesses.

JOHN BAKA-ABAKOWSKY.

Witnesses:
 GUSTAVE EDGAR CARLING,
 EUGEN KNORRE.